(12) United States Patent
Vallala et al.

(10) Patent No.: US 8,824,484 B2
(45) Date of Patent: Sep. 2, 2014

(54) SYSTEM AND METHOD FOR DETERMINISTIC I/O WITH ETHERNET BASED INDUSTRIAL NETWORKS

(75) Inventors: Vijay Vallala, North Andover, MA (US); Alen Mehmedagic, Wilmington, MA (US); Kenneth Lee, Cambridge, MA (US); George Ditzel, Nashua, NH (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 296 days.

(21) Appl. No.: 13/357,762

(22) Filed: Jan. 25, 2012

(65) Prior Publication Data

US 2013/0188642 A1   Jul. 25, 2013

(51) Int. Cl.
*H04L 12/28* (2006.01)
*H04L 12/56* (2006.01)

(52) U.S. Cl.
USPC ............................. 370/395.4; 370/389

(58) Field of Classification Search
USPC ............ 370/395.42, 390, 359, 419, 463
See application file for complete search history.

(56) References Cited

U.S. PATENT DOCUMENTS

| | | | |
|---|---|---|---|
| 7,269,158 B2* | 9/2007 | Francois et al. | 370/351 |
| 8,194,666 B2* | 6/2012 | Davis | 370/392 |
| 8,509,832 B1* | 8/2013 | Daigle | 455/512 |
| 2003/0152067 A1* | 8/2003 | Richmond et al. | 370/352 |
| 2004/0081093 A1* | 4/2004 | Haddock et al. | 370/230 |
| 2007/0127370 A1* | 6/2007 | Chang et al. | 370/229 |
| 2012/0027024 A1* | 2/2012 | Liang | 370/412 |

OTHER PUBLICATIONS

"Introduction to Real-Time Ethernet II, Course 402," downloaded from http://www.industrialethernetu.com/courses/402_1.htm and subsequent pages on Jan. 26, 2012.
"EtherCAT," downloaded from http://en.wikipedia.org/wiki/EtherCAT on Jan. 26, 2012.
"PROFINET," downloaded from http://en.wikipedia.org/wiki/Profinet on Jan. 26, 2012.
"Ethernet Powerlink," http://en.wikipedia.org/wiki/Ethernet_Powerlink on Jan. 26, 2012.
"Quantum Ethernet I/O: System Planning Guide," Jul. 2011, Schneider Electric, Available at www.schneider-electric.com.

* cited by examiner

*Primary Examiner* — Warner Wong
(74) *Attorney, Agent, or Firm* — Banner & Witcoff Ltd.

(57) ABSTRACT

A networking system is discussed. The system may be used for industrial networks, where deterministic behavior is often valued. Bounded message travel times may be achieved for a first set of network traffic. Additional traffic may be routed over the networking system without interfering with the message travel times associated with the first set of network traffic. Systems and methods for assigning priority to various sets of network traffic are discussed.

19 Claims, 6 Drawing Sheets

| Port # | IN | | OUT | | | |
| --- | --- | --- | --- | --- | --- | --- |
| | TAG | Port # 1 | Port # 2 | Port # 3 | Internal Port |
| 1 (low priority traffic only) | w/ NO TAG | | TAG w/ Low Priority | TAG w/ Low Priority | Low Priority |
| | w/ TAG (any) | | TAG w/ Low Priority | TAG w/ Low Priority | Low Priority |
| 2 | w/ NO TAG | NO TAG | | TAG w/ Low Priority | Low Priority |
| | w/ TAG (any) | NO TAG | | maintain TAG | Priority based on incoming TAG value |
| 3 | w/ NO TAG | NO TAG | TAG w/ Low Priority | | Low Priority |
| | w/ TAG (any) | NO TAG | maintain TAG | | Priority based on incoming TAG value |
| Internal Port | w/ NO TAG | NO TAG | TAG based on content | TAG based on content | |
| | w/ TAG | NO TAG | maintain TAG | maintain TAG | |

Figure 4

SYSTEM AND METHOD FOR DETERMINISTIC I/O WITH ETHERNET BASED INDUSTRIAL NETWORKS

BACKGROUND

Many environments are sensitive to the amount of time it takes for messages to travel between two networked machines. For example, in many industrial applications it is essential to know the maximum time it will take for a message to travel from one device to another. Most widespread communications protocols, such as TCP/IP, cannot provide the consistent, predictable behavior needed for environments that are sensitive to the time it takes for information to be communicated between devices. Consequently, these environments have used specialized communications hardware to achieve predictable message travel times.

SUMMARY

Some aspects of the disclosure relate to methods for transmitting messages with predictable message travel times using standard Ethernet hardware and message routing that is compatible with established standards such as IEEE 802.1 D/Q.

Additional aspects of the disclosure relate to determining the application response time and/or message travel time for various networks and how changes in network topology may affect these times.

According to still further aspects of the disclosure, devices that transmit low-priority traffic may be attached to a network, such as an industrial network, without affecting the application response time and/or message travel time for higher-priority traffic.

Additional aspects of the disclosure relate to how devices on a network may add, remove, or alter priority tags on received traffic. These behaviors may ensure that devices that transmit low-priority traffic do not interfere with higher-priority traffic.

The preceding presents a simplified summary in order to provide a basic understanding of some aspects of the disclosure. The summary is not an extensive overview of the disclosure. It is intended neither to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

FIG. 4 shows a table that illustrates an example of how a device may assign tags to messages, such as Ethernet frames.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
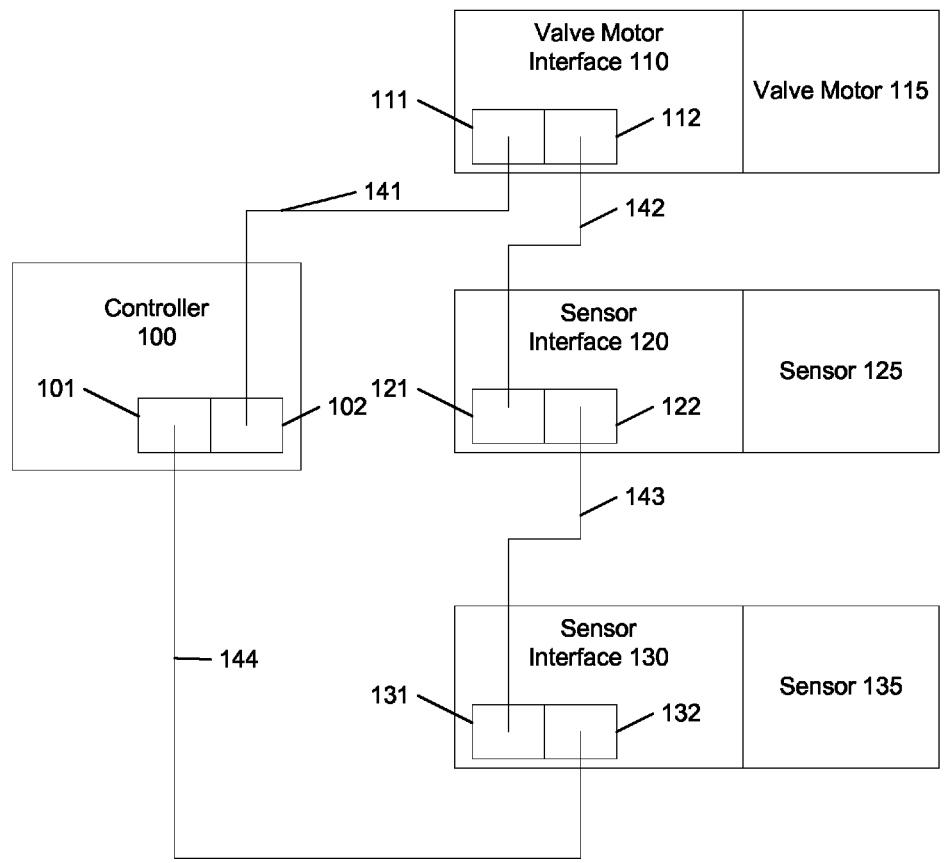
FIG. 1 illustrates an example of an industrial network.

FIG. 1 illustrates an example of an industrial network, such as an Industrial Ethernet network. In this example a controller 100 is connected to valve motor interface 110, sensor interface 120, and sensor interface 130 by Ethernet cables 141-144. Two Ethernet ports (101 and 102) are illustrated on controller 100. Two Ethernet ports are also illustrated on each of valve motor interface 110, sensor interface 120, and sensor interface 130. In this example, controller 100 may receive readings from the sensors 125 and 135, which are connected to sensor interfaces 120 and 130, process those readings, and generate an output that controls valve motor 115, which is connected to valve motor interface 110 based on those readings. Such a system may be used, for example, to regulate the amount of fluid that the value controlled by motor 115 allows into a mixing device. The industrial network of FIG. 1 is merely an example. It is to be understood that industrial networks may be made up of a number of other devices, that industrial networks may have different network configurations, and that industrial networks may serve different purposes.

In the example of FIG. 1, Ethernet cables 141-144 form a daisy-chain loop. This configuration allows all of the devices shown in FIG. 1 (i.e. devices 100, 115, 125, and 135) to continue communicating even if any one of the Ethernet cables is removed. Similarly, the daisy-chain loop configuration allows for continued communications even when one of the devices in the loop is powered off. The redundancy provided by a daisy-chain loop configuration may allow for uninterrupted or minimally interrupted operation when an accidental cable cut or any other cable failure occurs. Other network topologies may also be used. For example, removing any one of Ethernet cables 141-144 from the example of FIG. 1 would result in a daisy-chain topology with no loops.

Many industrial processes rely on inputs being processed and converted to outputs in a deterministic fashion. For example, the process controlling the devices of FIG. 1 may rely on the readings detected by sensors 125 and 135 causing motor 115 to adjust a valve within 250 ms of the readings under normal operating conditions. This 250 ms limit is an example of an application response time (ART). One aspect of achieving an ART limit is using a controller (e.g. a programmable logic controller, personal computer, distributed control system, remote terminal unit, etc.) that processes inputs and produces outputs based on those inputs within a predetermined amount of time. Another aspect of achieving an ART limit is structuring the communications between devices (e.g. devices 100, 115, 125, and 135 of FIG. 1) so that the messages relevant to the time-limited process arrive within a predetermined amount of time. This time may be referred to as the message travel time. For example, if controller 100 produces outputs based on new inputs in 50 ms, and communications between devices 100, 115, 125, and 135 are delayed by a maximum of 60 ms, then the total message travel and processing delay may be 170 ms (60 ms+50 ms+60 ms) or less.

In some systems, an equipment failure, such as a cable failure or any other violation of the expected operating conditions, may cause an ART limit to be violated. Some failures may cause the system to stop meeting the ART limit until the failure is repaired. Other failures may cause the system to stop meeting the ART limit only momentarily. For example, a single cable failure may cause a maximum of 100 ms of additional message travel delay as the devices of the system reconfigure themselves. If this is the case, the 250 ms ART limit of the example above may be violated once, but the system may resume meeting the 250 ms ART limit thereafter.

Some failures may not cause a system to stop working as designed at all. For example, if a single cable failure may cause a maximum additional delay of 80 ms, then the 250 ms ART limit of the example above may still be met even when a cable failure occurs. (In the example above, the maximum message travel and processing delay was 170 ms. 170 ms+80 ms≤250 ms.)

The number of devices that are connected together may affect the maximum message travel time. Continuing the above example, it may take up to 20 ms to communicate a message across each of Ethernet cables 141-144. Thus, the maximum delay for communications between controller 100 and valve motor interface 110 is 20 ms if the message is transmitted across Ethernet cable 141. If the message is instead transmitted across Ethernet cables 144, 143, and 142, the maximum delay is 60 ms, because three hops, each taking up to 20 ms, were used instead of one. A message may be transmitted along this longer route due to, for example, a cable failure or message routing rules. For instance, the message transmitted to valve motor interface 110 may also need to be received by sensor interface 130, or by some other device. Connecting more devices together may increase the maximum message travel time by increasing the number of hops each message may traverse. The delay at each hop may be caused by, for example, transmission delay (also known as store-and-forward or switch-and-forward delay, which is the time it takes to transmit a message), propagation delay (the time it takes for the message to travel across a cable), processing delay (the time it takes for a device to process the message), and queuing delay (the time a message may need to wait for other messages). These delays will be discussed in more detail below.

Figure 2:
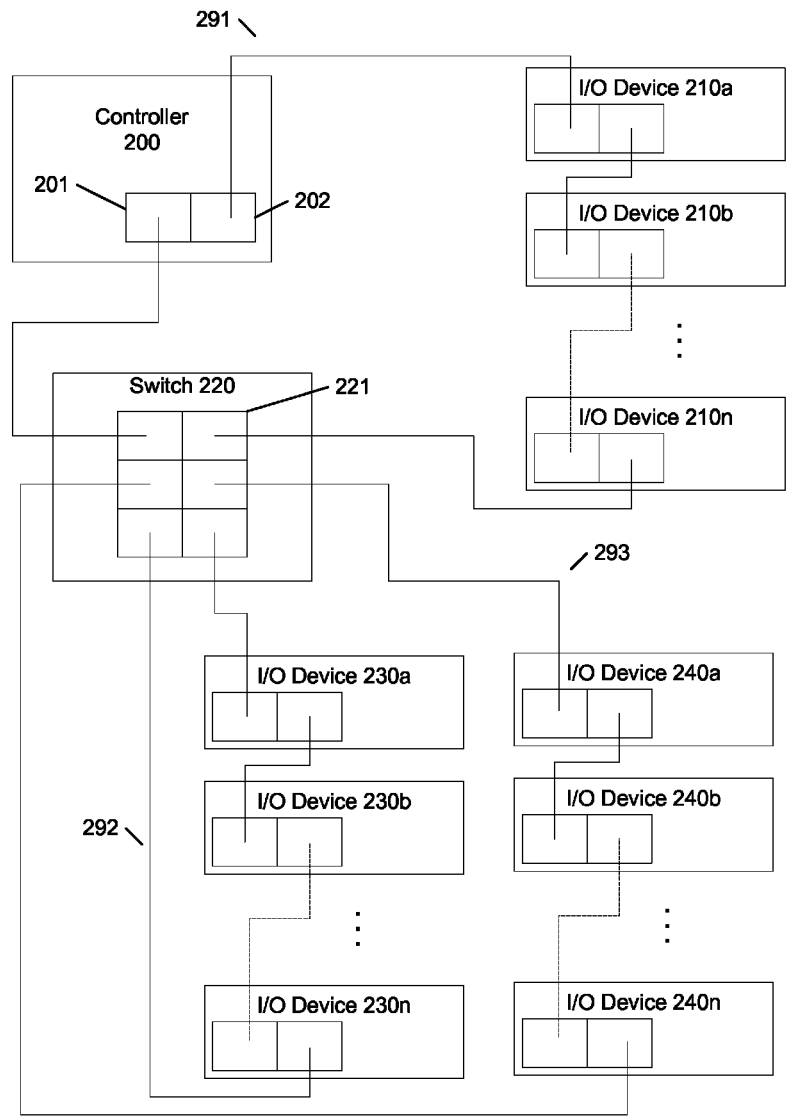
FIG. 2 illustrates an example of an industrial network having three daisy-chain loops.

FIG. 2 illustrates an example of an industrial network having three daisy-chain loops 291, 292, and 293. The first loop (291) is formed between controller 200, I/O devices 210a through 210n, and switch 220. The second loop (292) is formed between switch 220 and I/O devices 230a through 230n. The third loop (293) is formed between switch 220 and I/O devices 240a through 240n. By using multiple loops, the largest number of hops required for a message to reach any one device is reduced from the number of hops that would have been required if all the devices were connected in a single large loop. Using multiple daisy-chain loops may therefore reduce the maximum message travel time.

Although network interfaces for sensors and a valve motor were identified in FIG. 1, an industrial network may contain any type of device. FIG. 2 reflects this by identifying the connected devices as simply "Controller" (200) and "I/O Device" (210, 230, and 240), each of which has a network interface. Switch 220 enables each of these devices to communicate with one another by forwarding messages from any one of the daisy-chain loops to any of the other daisy-chain loops. Switch 220 is illustrated as having six ports (221). A switch may have more or fewer ports to support more or fewer chains of devices. Although only one switch is illustrated in FIG. 2, an industrial network may include multiple switches. The switches, and any daisy-chains connected to them, may be distributed throughout the network.

The maximum total ART may be calculated by summing all of the delays that may occur under normal operating conditions. These delays will now be discussed in the order they may occur. First, an I/O device generates a message. This message may be, for example, a reading from a sensor. Many devices accept new messages at a predefined time interval, which may be known as a scan rate. The new message may not be generated until just after a scan begins. Thus, the message may not be accepted by the network interface of the I/O device until the next scan begins. Thus, a delay of one input scan may be possible before the message is accepted for transmission.

Once a message is accepted for transmission by the network interface of the I/O device, the message may not be transmitted immediately. A message may be delayed until other traffic that is to be output from the I/O device on the same port has cleared. Assuming the message is prioritized above all other traffic, the maximum delay is the delay that results from the message being received just after an earlier message begins being transmitted. This time may be referred to as a queue delay, as it is the maximum time the message may be queued before its transmission begins.

If a message is not prioritized above all other traffic, then the length of the queue delay would depend on the volume of higher-priority traffic to be transmitted before the message. For this reason, messages related to applications with ART limits may be given the highest priority. Queue delay can also be limited by controlling the total amount of traffic that may be transmitted on the network. In some cases, only high-priority traffic is limited. For example, the number of devices capable of transmitting high-priority traffic may be limited such that the devices, even when transmitting at their maximum rate, do not transmit enough high-priority messages to cause a backup of high-priority messages.

In addition to queuing delay, a processing delay may exist. One example of a processing delay is that, in network interfaces configured to produce packets at a predefined time interval, and a message may be delayed until the beginning of the next interval. Another example of a processing delay is the time required to examine a received message and determine what to do with it.

The next delay is the time it takes to transmit the message. This transmission delay is affected by the size of the message and the speed of the link.

Once a message is transmitted from one I/O device, the next delay is the time it takes for the message to be relayed back to the controller. This time depends on the number of hops between a device and the controller. At each hop, the message may be delayed by the time it takes for the message to be received, placed in the output queue, and transmitted to the next hop. Each of these steps was described above with respect to the message being received, placed in the output queue, and transmitted from the device that originates the message.

A switch, such as switch 220, may receive several messages simultaneously due to it having several ports. If incoming messages are received simultaneously on several of these ports, and several of the messages are to be transmitted on the same port, the queuing delay for the switch may become greater than the queueing delay for devices with fewer ports. Each additional port that a switch contains adds the possibility that the size of the message queue will increase by one message.

Once the message reaches the controller, it may be delayed by the time it takes the controller to receive the message (i.e. by the length of the controller's scan interval). Once received, the message will then be processed and used by the controller to generate a second message. For instance, in the example of FIG. 1 a message from a sensor was processed by a controller and used to generate a second message to a valve motor. As was mentioned previously, the processing time of many controllers is deterministic, so a maximum amount of time required to generate the second message is known in many embodiments.

The second message must then be output from the controller to the network. This may result in delays as the second message is received by the controller's network interface, queued within the controller's network interface, and then transmitted from the controller's network interface. In some embodiments, the controller may generate messages such that there is no queuing delay at this stage. Also, in some embodiments the time required for the second message to be received by the controller's network interface may be very limited. This can be accomplished by immediately transmitting the second message regardless of the scan cycle. In some embodiments the technique of immediately transmitting a message regardless of the scan cycle may be applied to other devices in the network besides the controller, including I/O devices.

Once the second message is transmitted from the controller's network interface, the next delay is the time it takes for the message to be transmitted to the appropriate I/O device(s). Like the delay for a message traveling from an I/O device to the controller, this delay depends on the number of hops between the device(s) receiving the second message and the controller. At each hop, the message may be delayed by the time it takes for the message to be received, placed in the output queue, and transmitted to the next hop.

Once the second message is received by the destination I/O device's network interface, the next delay is the time it takes to pass the message from the network interface to the device itself. Similar to the controller and the network interface itself, the device may accept new messages with a pre-defined scan rate. Thus, the second message may be delayed by up to the length of a scan.

Summing each of the delays above allows the ART and message travel time for a particular message path to be calculated. In order to allow for cable failures, the ART and/or message travel time may also be calculated by assuming that all messages will travel around each daisy-chain loop in the direction that includes the most hops. The calculation can be simplified further by setting a maximum number of devices per daisy-chain loop and a maximum number of loops. Instead of identifying the actual number of hops that exist, the maximum number of hops and switch traversals that are allowed by these maximums may be assumed. Making this assumption may yield an ART and/or message travel time that is greater than the real maximum. The ART and/or message travel time calculated with this assumption may be useful because it provides an upper bound on what the real ART and/or message travel time may be. Further, this upper bound may apply even if devices are added to the network or the network is otherwise reconfigured.

A device's network interface may be integral with or separate from the device itself. For example, a device's network interface may be a separate module that connects to the device using, for example, a group of wires. Although FIG. 2 is illustrated with only one controller, an industrial network may include several controllers. Neither of these possibilities changes the discussion of the delays that make up the ART above. If the multiple controllers communicate with one another across the network in order to produce an output, that additional step may increase the ART. The communication may also be considered part of a controller's processing time.

Industrial networks may carry traffic that is not as time sensitive as the traffic for which an ART needs to be known. This less-time-sensitive traffic may be carried on the same Ethernet cables used to transmit the messages for which an ART needs to be known. Carrying both of these types of traffic on the same Ethernet cables can be accomplished by prioritizing the less-time-sensitive messages behind the more-time-sensitive messages. For example, a device may have four messages queued for transmission. The device may select the highest priority message for transmission first, regardless of when that message arrived relative to the other messages in the queue.

Figure 3:
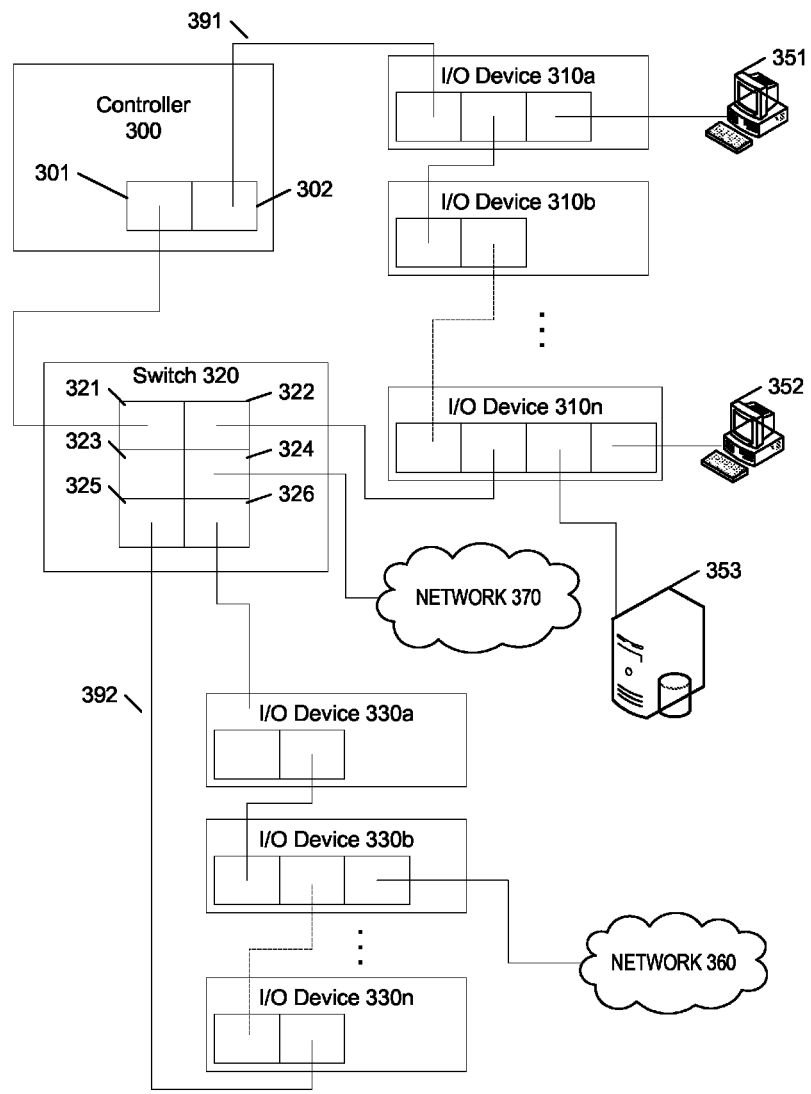
FIG. 3 illustrates an example of an industrial network that has devices that generate low-priority traffic attached.

FIG. 3 illustrates an example of an industrial network that has devices that generate low-priority traffic. Traffic from these devices may be low-priority because, for example, delays in transmitting the traffic are less likely to interfere with a time-sensitive process. FIG. 3 includes two daisy-chain loops 391 and 392. The first loop (391) includes controller 300, switch 320, and I/O devices 310*a* through 310*n*. The second loop (392) includes switch 320 and I/O devices 330*a* through 330*n*. I/O device 310*a* includes a third Ethernet port. Computer 351 is attached to this port. Computer 351 may be used, for example, to view diagnostic web pages generated by any of the devices seen on the network of FIG. 3. The traffic to and from computer 351 may be prioritized below traffic between I/O devices 310 or 330 and controller 300.

I/O device 310*n* includes four Ethernet ports. Computer 352 is attached on one of the ports. Server 353 is attached to another of the ports. These attached devices may serve any purpose. Examples may include logging and storing information about the operation of the industrial network. Other examples may be unrelated to the operation of the industrial network. For example, network 370 may be a corporate intranet. Computer 352 and/or server 353 may connect to the industrial network in order to reach network 370. Similarly, network 360 is also connected to the industrial network, and the industrial network may be used to transport messages between these networks. Computers 351 and 352, server 353, and networks 360 and 370 are not illustrated as being connected using daisy-chain loops. Unlike a daisy-chain loop, these connections may fail if only one Ethernet cable fails. These devices could be connected using a daisy-chain loop to reduce the impact of a cable failure. Similarly, the devices that are in a daisy-chain loop may be connected using another topology, such as a simple daisy-chain (without a loop) or hub-and-spoke connections.

More-time-sensitive messages may be prioritized above less-time-sensitive messages by using the tags specified by the IEEE 802.1 Q standard. These tags are part of the Ethernet headers defined the IEEE 802.1Q standard. The tags may also be known as 802.1 D/Q tags, which is a reference to the IEEE 802.1 D standard that may be implemented concurrently with the IEEE 802.1 Q standard. The tags specified by IEEE 802.1Q include three bits that represent the priority of an Ethernet frame. By using the 802.1Q standard and the techniques described herein, message transmission with a bounded delay can be achieved for high-priority messages without requiring any special-purpose hardware. Instead, all hardware in the network may be compliant with one or more of the IEEE 802.3 standards for wired Ethernet. These techniques may be combined with the EtherNet/IP standard. The "IP" in this standard stands for "Industrial Protocol."

Other tags may also be used to indicate the priority of messages transmitted within an industrial network. For example, if messages are contained in IP (internet protocol) packets, then differentiated services control point (DSCP) tags, which are 6-bit fields of IP headers, may be used. Further, a non-standard tag may be used to identify the priority of messages within an industrial network.

In some embodiments, tags for priority may be included only on the daisy-chain loops (or other network topologies) over which the most time-sensitive messages travel. In other embodiments, tags for priority may be included in messages that travel over some or all of the other Ethernet cables, such as the cable connecting computer 351 to I/O device 310*a*. Where tags that indicate priority are included in messages that travel over cables that connect to devices that generate lower-priority traffic, those tags may be checked in order to ensure they do not include high-priority tags. If high-priority tags are discovered coming from ports that are designated for lower-priority traffic, the high-priority tags may be replaced with tags indicating a lower level of priority.

FIG. 4 shows a table that illustrates an example of how a device may assign tags to messages, such as Ethernet frames. In this example, the device has three external ports. I/O device 310*a* is an example of a device having three external ports. The behavior of the ports of an I/O device may be configurable. In this example, port number 1 is designated for low priority traffic only. In the example of FIG. 3, port number 1 may be the port that connects to computer 351. Ports 2 and 3 in this example may be used in a daisy-chain loop, which may send and receive higher-priority traffic. The internal port is the port that connects the network interface to the rest of the I/O device. The internal port may, for example, receive readings from a sensor or deliver messages to a sensor.

In the example of FIG. 4, all traffic received on port 1 is tagged as low priority before being transmitted from ports 2 or 3. Similarly, all traffic received on port 1 is treated as low priority if it is sent to the internal port. This may be accomplished by adding a tag to the received traffic. Alternatively, an indication that the messages are to be given low priority may be stored in the memory of the device without adding a tag to the messages themselves. That certain traffic is to be treated with low priority may also be inherent in the design of the I/O device.

In the example of FIG. 4, all traffic that is transmitted on port 1 is given no tag at all. This is the case even if the traffic was received with a tag. This behavior makes the network interface of the I/O device compliant with external devices that may not support the tags that are used on ports 2 or 3.

The priority tag for traffic received on ports 2 or 3 is not altered if that traffic will also be transmitted on ports 2 or 3. If traffic is received on ports 2 or 3 without a tag, the traffic may be tagged as low priority if it will be transmitted on ports 2 or 3. Traffic received on ports 2 or 3 that will be transmitted on the internal port may mirror this behavior. As mentioned above with respect to traffic received from port 1, the internal port may store the priority levels of the messages without storing a tag in the messages themselves.

Messages from the internal port that are destined for ports 2 or 3 may already be tagged based on, for example, the content of the messages. If a tag already exists, the priority value of the tag may be maintained. If messages received on the internal port do not already include a tag, then a tag may be generated with a priority level that is determined based on the content of the message. For example, messages related to a process with a maximum ART may be given the highest priority, and other messages may be given lower priorities. The priority to assign to messages received on the internal port may be determined based on other priority tags included within the message. For example, if 802.1 Q tags are being used and the message content contains a DSCP tag, an 802.1 Q tag may be generated with a priority level that corresponds to the priority level of the DSCP tag. A default priority level may be used for messages received on the internal port without tags. Because the internal port may be more likely to receive time-sensitive messages than port 1, this default priority level may be a higher level than the low priority level given to traffic from port 1.

The behavior illustrated in FIG. 4 is merely an example, and many alternatives and variations are possible. In FIG. 4, all priority levels above the low priority level were reserved for use by the devices connected to ports 2 and 3. Only the low priority level was available for traffic from port 1. This allocation of the priority levels allows for certain traffic from the controller or I/O devices to be prioritized below other traffic from the controller or I/O devices but still be prioritized above the traffic received on ports designated for low priority traffic, such as number 1 in FIG. 4. This allocation may be preferable where, for example, meeting a given ART is essential for some processes on the network, but is only preferred for other traffic on the network. It may also be preferable where, for example, the ART needed for certain traffic requires high-priority treatment in order to be met, but that the ART required for other traffic is large enough that allowing high-priority traffic to take precedence will not result in the maximum allowable ART for the other traffic being exceeded.

Other allocations of the priority levels are possible. For instance, only the highest priority level may be reserved for use by the devices connected to ports 2 or 3. This could be achieved by tagging traffic received on port 1 with a priority level that reflects the priority tag with which the traffic was received. But, if the priority tag that is received on port 1 is the highest priority, the tag would be re-written to the next lower priority level (i.e. the second-highest priority level). Traffic received on port 1 without a tag may be given a default priority level, which may or may not be the lowest priority level.

Another possible allocation of the priority levels is for an intermediate number of the priority levels to be reserved for use by the devices connected to ports 2 or 3. Traffic with the reserved priority levels received on port 1 may be assigned the highest non-reserved priority level. Alternatively, a mapping of the received priority levels to output priority levels may be established. For example, the received priority levels may be divided by two. The threshold between the priority level(s) reserves for the second and third ports and the priority level(s) available to the first port may be configurable.

In the example of FIG. 4, all traffic transmitted out from port 1 is not given a tag, and all traffic transmitted from ports 2 or 3 is given a tag. Alternatively, traffic transmitted from port 1 may be given a tag where the traffic is received with a tag, or all traffic transmitted from port 1 may be given a tag. This tag may reflect a default priority level where the traffic was not received with a tag. Similarly, traffic may be transmitted on ports 2 or 3 without a tag. For example, traffic without a tag may be treated as having a default priority level, and tags may be applied only to traffic for which the priority level is different from the default.

The example of FIG. 4, as well as the various alternatives and variations discussed above, may ensure that only traffic received on ports 2 or 3 are assigned the highest priority level(s). This allows for devices connected to other ports to behave in any manner while still ensuring that the highest priorities are assigned only to traffic for which a deterministic response time is desired.

Although FIG. 4 illustrates a method of forwarding messages for a device having three ports, more or fewer ports may be used. For example, additional ports configured for low priority traffic only may be added. I/O Device 310*n* illustrates an example of a device with one additional port that may be configured for low priority traffic only. A device may also be configured with no ports dedicated to low priority traffic. A greater or fewer number of ports that accept high priority traffic may also be included. For example, switch 320 may accept and send high priority traffic on ports 321, 322, 323, 325, and 326. As seen by the example of a switch, an internal port may also be omitted. Similarly, several internal ports may exist where, for example, several devices that may send or receive messages are collocated with the network interface.

Figure 6:
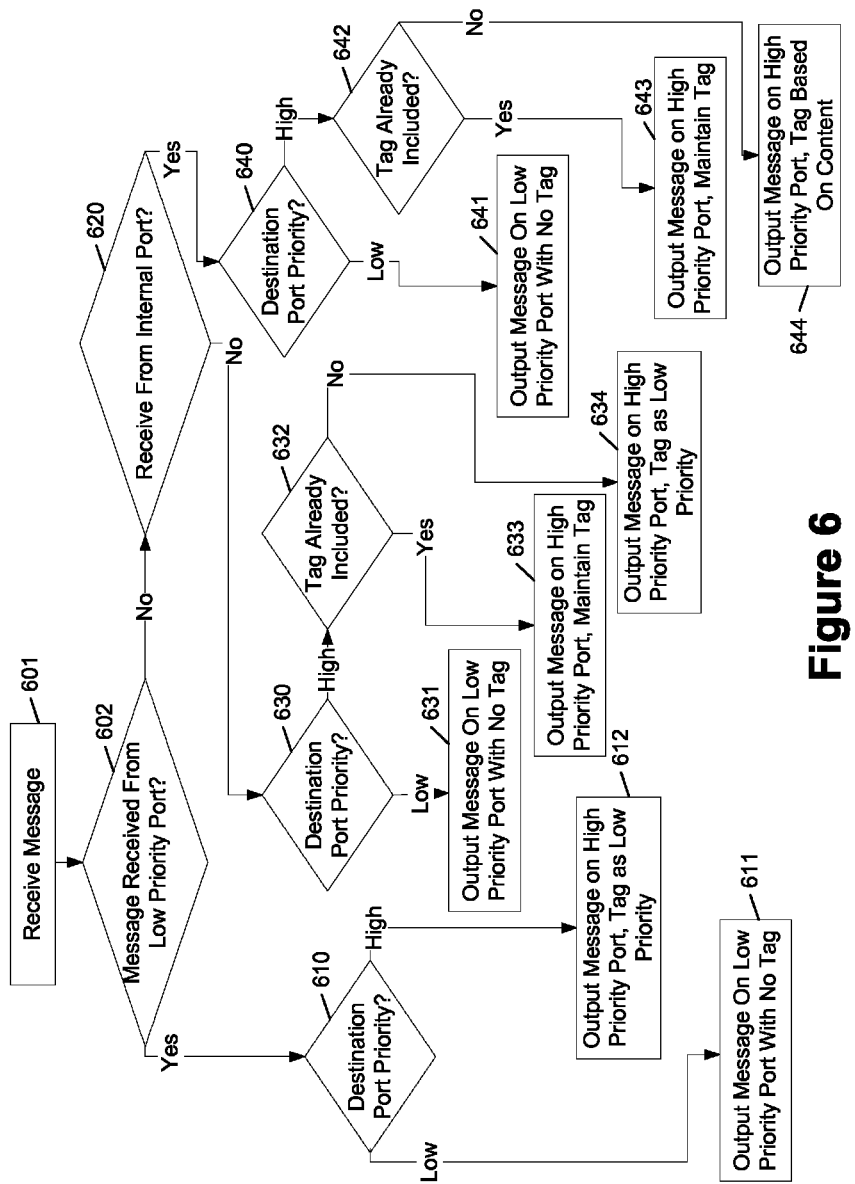
FIG. 6 is a flow diagram illustrating a method of forwarding messages.

FIG. 6 is a flow diagram illustrating a method of forwarding messages. The method may be performed by any of the devices in a network. The illustrated method is compatible with the behavior illustrated in FIG. 4, although the method illustrated in FIG. 6 is not specific to any particular number of low or high priority ports. In step 601, a message is received. In step 602, whether the message was received from a port that is designated as a low priority port is determined.

If the message was received from a low priority port, then it is determined, at step 610, whether the message is to be output from a low priority port or a high priority port. If the message is to be output from a low priority port, then it is output with no tag in step 611. If the message is to be output from a high priority port, then it is output with a tag indicating low priority in step 612.

If step 602 determines that the message was received from a port that is not designated as a low priority port, then the method continues to step 620, where it is determined whether the message was received from an internal port.

If the message was not received from an internal port, then whether the destination port is a high or low priority port is determined at step 630. If the destination port is a low priority port, then the message is output from the low priority port without a tag at step 631. If the destination port is a high priority port, then whether a tag is included in the received message is determined in step 632. If a tag is included in the received message, then the message is output with a tag indicating the same priority as the tag included in the received message in step 633. If a tag is not included in the received message, then the message is output with a tag indicating low priority in step 634.

If the message was received from an internal port, then whether the destination port is a high or low priority port is determined at step 640. If the destination port is a low priority port, then the message is output from the low priority port without a tag at step 641. If the destination port is a high priority port, then whether a tag is included in the received message is determined in step 642. If a tag is included in the received message, then the message is output with a tag indicating the same priority as the tag included in the received message in step 643. If a tag is not included in the received message, then the message is output with a tag in step 644. The priority level indicated by the tag used in step 644 is determined based on the content of the message, as discussed above with reference to FIG. 4.

The method of FIG. 6 may be modified, as was discussed above with respect to modifications to the behavior illustrated in table 4. Examples of modifications include applying a default priority level to untagged traffic, transmitting untagged traffic from high priority ports, using a different allocation of priority levels, and including intermediate-priority ports in addition to high and low priority ports.

Figure 5:
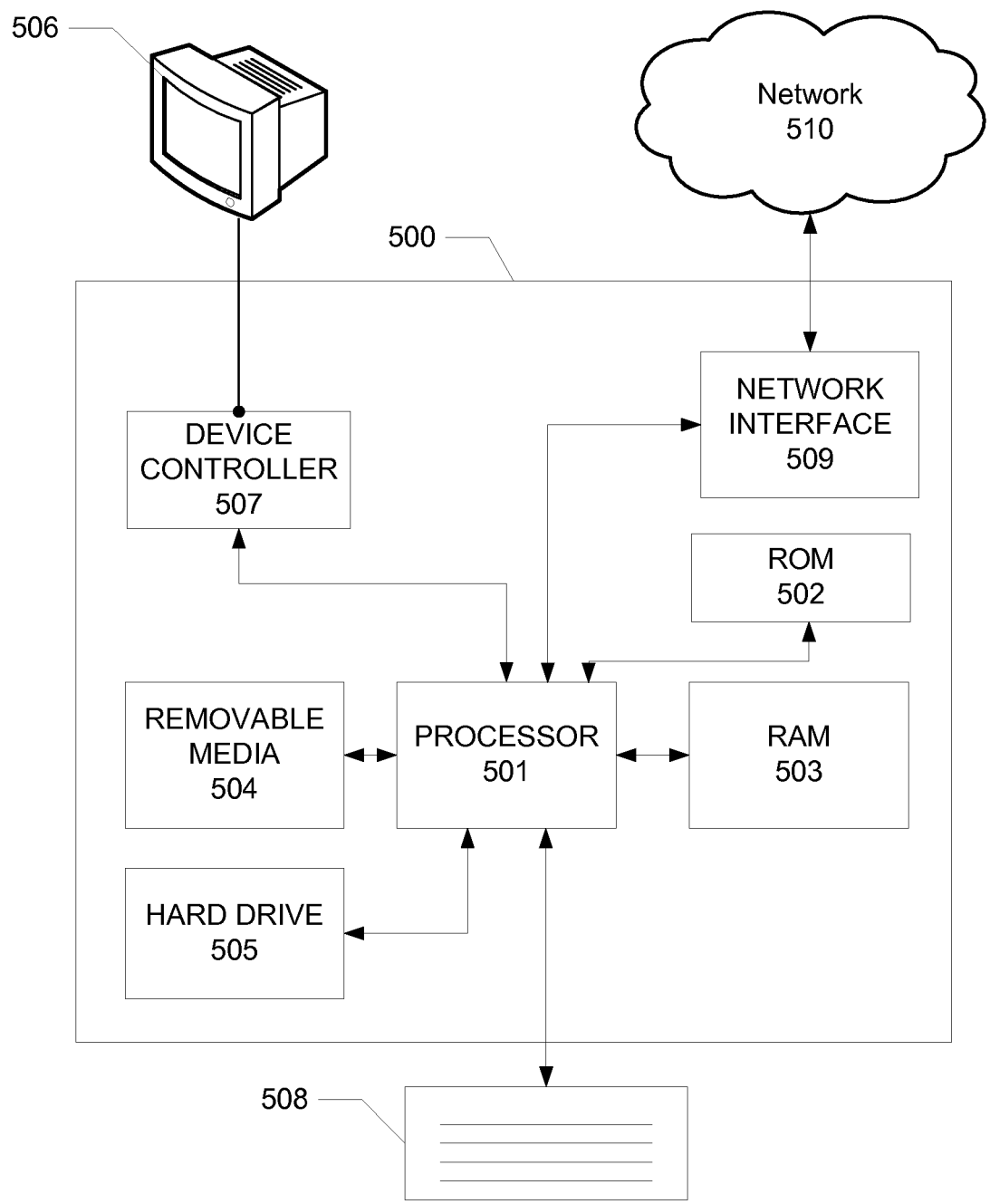
FIG. 5 illustrates an example computing device on which various methods and devices of the disclosure may be implemented.

FIG. 5 illustrates an example of general hardware and software elements that may be used to implement any of the various computing devices discussed above, such as controllers, switches, or I/O devices, including sensors, motors, etc. Computing device 500 may include one or more processors 501, which may execute instructions of a computer program to perform any of the features described herein. The instructions may be stored in any type of computer-readable medium or memory, to configure the operation of the processor 501. For example, instructions may be stored in a read-only memory (ROM) 502, random access memory (RAM) 503, removable media 504, such as a Universal Serial Bus (USB) drive, compact disk (CD) or digital versatile disk (DVD), floppy disk drive, or any other desired electronic storage medium. Instructions may also be stored in an attached (or internal) hard drive 505. Structures such as FPGAs (field programmable gate arrays) and/or ASICs (application-specific integrated circuits) may also be used. The computing device 500 may include one or more output devices, such as a display 506, and may include one or more output device controllers 507, such as a video processor. There may also be one or more user input devices 508, such as a remote control, keyboard, mouse, touch screen, microphone, etc. The computing device may also be connectable to other devices that provide a display and/or user input devices. The computing device 500 may also include one or more network interfaces 509, such as those described above, to communicate with one or more external networks 510.

One or more aspects of the disclosure may be embodied in computer-usable or readable data and/or executable instructions, such as in one or more program modules, executed by one or more processors or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium, as described above. As will be appreciated by one of skill in the art, the functionality of the program modules may be combined or distributed as desired in various illustrative embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of executable instructions and computer-usable data described herein.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A device comprising:
a first, a second, and a third Ethernet port; and a network interface connected to each of said Ethernet ports, the network interface configured to:
for Ethernet frames received on the first port and destined for the second port or third port, ensure that any priority tags of the frames do not indicate a priority that exceeds a predetermined threshold upon transmission from the second port or third port; and
for Ethernet frames received on the second port or third port and destined for the second port or third port, preserve the priority level indicated in any priority tags of the received frames upon transmission from the second port or third port,
for Ethernet frames received on the first port and destined for the second port or third port, ensure that any priority tags of the frames do not indicate a priority that exceeds the predetermined threshold upon transmission from the second port or third port by setting the priority level of the frames to a default value.

2. The device of claim 1, wherein the network interface is configured to:
for Ethernet frames received without a priority tag and destined for the second port or third port, add a priority tag to the frames indicating the frames have a low priority.

3. The device of claim 2, wherein the network interface is configured to:
for Ethernet frames destined for the first port, transmit the frames without a priority tag.

4. The device of claim 2, wherein each priority tag is contained in an IEEE 802.1 Q header.

5. The device of claim 4, wherein the network interface is configured to comply with at least one of the IEEE 802.3 standards for wired Ethernet.

6. The device of claim 2, wherein the network interface is connected to a message generating device, and the network interface is configured to tag Ethernet frames containing messages received from the message generating device and destined for the second port or third port with a priority tag whose priority level is determined by the content of each message.

7. The device of claim 6, wherein the content of each message used to determine the priority level of the priority tag is a priority level indicated by a DSCP tag.

8. A system comprising:
a plurality of networking devices, each of the devices having two or more external Ethernet ports and some of the plurality of networking devices having three or more external Ethernet ports;
wherein each device of the plurality of networking devices having only two external ports is configured to receive Ethernet frames from another device and to preserve, upon transmission of the frames from the device, priority levels indicated by any priority tags of the received frames; and
wherein each device of the plurality of networking devices having three or more external ports is configured to:
receive first Ethernet frames from another device on either of two of the external ports of the device and to preserve, upon transmission of the first frames from the device on the other of said two external ports of the device, priority levels indicated by any priority tags of the first frames; and
receive second Ethernet frames from another device on an external port other than said two external ports of the device and to ensure, upon transmission of the second frames from the device on either of said two external ports of the device, that any priority tags of the second frames do not indicate a priority that exceeds a predetermined threshold.

9. The system of claim 8, further comprising:
a networking switch configured to enable communications between said plurality of networking devices when said plurality of networking devices are connected to said switch by one or more daisy-chain loops.

10. The system of claim 8, wherein each device of the plurality of networking devices having three or more external ports is configured to:
receive third Ethernet frames from another device without a priority tag and add, upon transmission of the third frames from the device on either of said two external ports of the device, a priority tag to the third frames indicating the third frames have a low priority.

11. The system of claim 8, wherein each device of the plurality of networking devices having three or more external ports is configured to:
ensure, upon transmission of the second frames from the device on either of said two external ports of the device, that any priority tags of the second frames do not indicate a priority that exceeds the predetermined threshold by setting priority tags of the second frames to a default value.

12. The system of claim 8, wherein said priority tags of said first and second Ethernet frames are contained in IEEE 802.1 Q headers.

13. The system of claim 12, wherein each of the plurality of networking devices are configured to comply with at least one of the IEEE 802.3 standards for wired Ethernet on all of said external Ethernet ports.

14. The system of claim 8, wherein the message travel time for Ethernet frames transmitted from the plurality of networking devices with priority tags indicating the highest priority level is bounded.

15. The system of claim 14, further comprising:
a controller configured to receive the messages contained in said Ethernet frames with priority tags indicating the highest priority level and to produce messages in response, wherein the controller produces responsive messages within a bounded controller cycle time; and
wherein the application response time associated with messages transmitted from the plurality of networking devices with priority tags indicating the highest priority level is bounded, the bound being a function of the bound on the controller cycle time and the bound on said message travel time.

16. The system of claim 14, wherein the message travel time for Ethernet frames transmitted from the plurality of networking devices with priority tags indicating a priority level below the highest priority level is unbounded.

17. The system of claim 8, wherein the plurality of networking devices are connected together with Ethernet cables in a configuration that includes one or more daisy-chains.

18. The system of claim 8, wherein the plurality of networking devices are connected together with Ethernet cables in a configuration that includes one or more daisy-chain loops.

19. A method comprising:
determining, at a network interface connected to a first, a second, and a third Ethernet port, that a first Ethernet frame was received on the first port and is destined for the second port or the third port and, in response, ensuring that the first Ethernet frame is output with a priority tag whose priority level does not exceed a predetermined threshold upon transmission from the second port or the third port by setting the priority level of untagged frames to a default value; and determining, at the network interface, that a second Ethernet frame was received on the second port or the third port and is destined for the second port or the third port, and, in response, preserving the priority level indicated in any priority tags of the second Ethernet frame when the second Ethernet frame is output.

* * * * *